US008293347B2

(12) United States Patent
Kruger et al.

(10) Patent No.: US 8,293,347 B2
(45) Date of Patent: Oct. 23, 2012

(54) PACKAGING WITH WATER SOLUBLE BARRIER LAYER

(75) Inventors: Arnoldus Jacobus Kruger, Centurion (ZA); Patricia Ann Truter, North Vancouver (CA)

(73) Assignee: CSIR, Pretoria (ZA)

( * ) Notice: Subject to any disclaimer, the term of this patent is extended or adjusted under 35 U.S.C. 154(b) by 375 days.

(21) Appl. No.: 10/540,990

(22) PCT Filed: Apr. 5, 2004

(86) PCT No.: PCT/IB2004/001035
§ 371 (c)(1),
(2), (4) Date: Jun. 6, 2006

(87) PCT Pub. No.: WO2004/089624
PCT Pub. Date: Oct. 21, 2004

(65) Prior Publication Data
US 2006/0246241 A1 Nov. 2, 2006

(30) Foreign Application Priority Data
Apr. 11, 2003 (ZA) .................................. 2003/2879

(51) Int. Cl.
*B32B 27/00* (2006.01)
*B32B 27/08* (2006.01)
(52) U.S. Cl. ..................... 428/35.7; 428/36.6; 428/36.7; 215/12.2; 206/528
(58) Field of Classification Search ................. 428/35.7, 428/36.6, 36.7; 215/12.2; 206/528
See application file for complete search history.

(56) References Cited

U.S. PATENT DOCUMENTS

| | | | | |
|---|---|---|---|---|
| 3,870,549 A | * | 3/1975 | Ruygrok | 428/142 |
| 3,997,703 A | | 12/1976 | Nakashio et al. | |
| 4,469,775 A | * | 9/1984 | Lynch et al. | 430/273.1 |
| 4,500,598 A | * | 2/1985 | Thoese | 428/331 |
| 4,553,973 A | | 11/1985 | Edgren | |
| 4,592,954 A | * | 6/1986 | Malhotra | 428/32.14 |
| 4,924,525 A | | 5/1990 | Bartasis | |
| 5,106,890 A | | 4/1992 | Maruhashi et al. | |
| 5,447,784 A | | 9/1995 | Williams et al. | |
| 5,972,375 A | * | 10/1999 | Truter et al. | 424/443 |
| 5,981,011 A | * | 11/1999 | Overcash et al. | 428/40.9 |

FOREIGN PATENT DOCUMENTS

| | | |
|---|---|---|
| WO | WO 93/12924 | 8/1993 |
| WO | WO 99/58331 | 11/1999 |
| WO | WO 03/089502 | 10/2003 |

OTHER PUBLICATIONS

"Blends Based on Poly(Vinyl Alcohol) and the Products Based on This Polymer" from Handbook of Polymer Blends and Composites, vols. 1-4. ed. Kulshreshtha, A.K.; Vasile, C. (2002). Smithers Rapra Technology. pp. 285-364.*
Hydrogels for biomedical applications, Allan S. Hoffman, Advanced Drug Delivery Reviews, 43 (2002) 3-12.
PCT International Search Report, PCT/IB2004/0011035 Apr. 5, 2004 (8 sheets).
PCT Written Opinion of the International Searching Authority, PCT/IB2004/001035 Apr. 5, 2004 (9 sheets).
Interactions Between Macromolecules in Solution and Intermacromolecular Complexes, E. Tsuchida, K. Abe, yr. 1982, vol. 45 (Advances in Polymer Science) pp. 1-125.
Interpolymer Complexation and Miscibility Enhancement by Hydrogen Bonding, Ming Jiang et al., (Advances in Polymer Science, vol. 146) pp. 120-196.
Interpolymer Complexes, EA Bekturov, LA Bimendina, (Advances in Polymer Science) yr. 1981, vol. 41, pp. 99-147.
Labuschagne, Philip W. et al., Improved Oxygen Barrier Performance of Poly(Vinyl Alcohol) Films Through Hydrogen Bond Complex With Poly(Methyl Vinyl Ether-Co-Maleic Acid); European Polymer Journal 44 (2008) 2146-2152.
Fried, J.R. et al., Compatibility of Poly(2,6-Dimethyl-1, 4-Phenylene Oxide) (Ppo)/Poly(Styrene-Co-4-Chlorostyrene) Blends. 1.Differential Scanning Claroimetry and Density Studies; Macromolecules—Acs Publications, pp. 149-158.
Pedrosa, P. et al., On the Glass Transition Behavior, Interaction Energies, and Hydrogen-Bonding Strengths of Binary Poly(P-Vinylphenol)/Polyether Blends; Acs Publications; pp. 101-109; Publication Date (Web) May 1, 2002.
Trong-Ming, Don et al., Antiplasticization Behavior of Polycaprolactone/Polycarbonate-Modified Expoxies, Polymer Engineering and Science, Mid-Nov. 1996, vol. 36, No. 21; pp. 2601-2613.
Shaoxiang, Lu et al., Blends and Interpolymer Complexes of Poly(Styrene-Co-4-Vinylphenylmethylphenylsilanol) and Poly(N-Vinylpyrrolidone); Polymers for Advanced Technologies vol. 7, pp. 553-559.

* cited by examiner

*Primary Examiner* — Michele L Jacobson
(74) *Attorney, Agent, or Firm* — Husch Blackwell LLP

(57) ABSTRACT

The invention provides a packaging material which comprises a polymeric base component and a barrier component which coats and lines a surface of the base component, the barrier component inhibiting migration of gases, vapors and liquids through the base component. The barrier component comprises a polymeric layer comprising at least two different polymeric species which are polar and which are water soluble. The different species have different chemical compositions and are complementary in that they are bound together physically by interpolymer complexation to form an interpenetrating physical network. The invention also provides a process for producing the packaging material which comprises coating at least one surface of the base component with the barrier component and causing the complementary species to interact together physically by interpolymer complexation to form an interpenetrating physical network.

32 Claims, No Drawings

PACKAGING WITH WATER SOLUBLE BARRIER LAYER

This invention relates to the packaging of goods or substances in packages or containers, in situations where migration of gases, vapours or liquids into or out of the interiors of the packages or containers is undesirable. More particularly, the invention relates to a packaging material suitable for use as a package or container in such packaging of goods, and to a process for producing such packaging material.

According to the invention there is provided a packaging material which comprises:

a polymeric base component; and a barrier component which coats and lines a surface of the base component, the barrier component inhibiting migration of gases, vapours and liquids through the base component, and the barrier component comprising a polymeric layer which coats and lines the surface of the base component, the polymeric layer comprising at least two different polymeric species which are polar and which are water soluble, the different species having different chemical compositions and being complementary in that they are bound together physically by interpolymer complexation to form an interpenetrating physical network which provides the barrier component.

It will be appreciated that, in the packaging to which the invention relates, the packaging material will typically be used to form packages or containers for holding or containing goods or substances to be packaged in the interiors thereof, the packages or containers having walls separating the goods or substances in their interiors from the ambient exterior surroundings of the packages or containers, and the inhibition being of the migration of gases, vapours and liquids through the walls of the packages or containers, for example to maintain the flavours or fragrances of the contents of the packages or containers, and to keep them unaffected by the surroundings for as long as possible.

The packaging material may accordingly be in the form of a package or container; and the package or container may be selected from the group consisting of capsules, blister packages, sachets, envelopes, jerry cans, bottles and jars. The packing material may have an inner surface which is coated and lined by the barrier component. Instead, or in addition, the packaging material may have an outer surface which is coated and lined by the barrier component.

In particular, each of the polar polymeric species may be hydrophilic; and the barrier component will usually comprise two said species, although, in principle, more than two such species can be employed. The requirement that the polar polymers be of different species means that they must be different with regard to their chemical composition, i.e. differing by more than mere molecular mass or other physical properties.

The fact that the complementary species of the barrier component will have interacted together to form an interpolymer complex, does not exclude the possibility that they may also be bonded together by cross-linking. However, the primary interaction between the polar species of the barrier component will nevertheless be by electrostatic attraction, hydrogen bonding, hydrophobic interactions, van der Waal's forces, Coulombic forces, dipole interactions or combinations thereof.

Furthermore, while the barrier component will usually adhere to the base component either electrostatically by means of said hydrophobic interactions, Coulombic forces, van der Waal's forces, hydrogen bonding, dipole interaction or combinations thereof, or by grafting to the base component to form covalent bonds therewith, both of these mechanisms need not necessarily simultaneously be present. It follows that the barrier component may adhere to the base component physically by electrostatic bonding. Instead or in addition, the barrier component may adhere to the base component chemically by covalent bonding.

When grafting is employed, one or more of the polymer species of the barrier component will be attached to the surface of the base component by covalent bonds, the surface layer provided by the barrier component optionally being semi-migrated or surface-penetrated into the base component.

When the barrier component is expected to be exposed to abrasion or scuffing, and/or when it is water soluble and is expected to be exposed to moisture, for example when it forms a coating which lines the outer surface of a package or container, or when it forms a coating which lines the inner surface of a package or container intended to hold an aqueous liquid, the invention contemplates the provision of a protective coating on the barrier component, on the opposite side of the barrier layer, remote from the base component. In other words, each barrier component may have a surface remote from the base component and having a protective coating thereon, on the opposite side of the barrier component from the base component. The protective coating may be of a material selected from the group consisting of thermosetting polymers, ultraviolet-curable polymers and thermoplastic polymers. More particularly, the material of the protective coating may be selected from the group consisting of the polymeric material of the base component, polyurethanes, urethane acrylates, polyvinylidine chlorides, polyacrylates, polyepoxides, polydimethyl siloxanes and copolymers of any two or more thereof.

With regard to the packages or containers of the present invention, they will typically in use contain goods or substances in the form of solids or, particularly liquids which can lose constituents thereof to the ambient surroundings or can receive unwanted constituents from the ambient surroundings, by migration of such constituents through the wall of the package or container, thereby, for example, having the flavours or fragrances of their contents adversely affected.

When the goods or substances to be packaged are for human consumption, for example foods, beverages or medicines, the barrier component will usually be intended to inhibit or hinder migration into the package or container of gases from the ambient surroundings, such as oxygen or carbon dioxide, which can have undesired or adverse effects on, and can spoil, the contents of the packages or containers. Naturally, instead, the barrier component can also resist unwanted loss of constituents to the surroundings, which can similarly devalue said contents. In yet other situations, such as when a jerry can is intended to contain a hydrocarbon fuel such as gasoline, diesel or kerosene, or aggressive liquids such as turpentine, paint stripper or thinners, emphasis will be on resisting unwanted migration out of the package or container, of constituents of the contents, through the walls of the package or container, to the ambient surroundings.

The polymeric base component may be of any polymeric material suitable for contact with, and containment of, the goods or substances to be packaged. For example, in the bottling of carbonated drinks or beverages such as beer, which is expected to be an important application of the present invention, the coating may line the outer surface of the package or container. In this case the packaging material may thus be in the form of a bottle for use in the bottling of carbonated drinks or beverages, there being a single barrier component which is located on the outer surface of the bottle, the base component comprising a polymeric plastics material selected from the group consisting of polyethylene terephthalates, polyethylene terephthalate glycols, polycarbonates, polystyrenes, polyamides, polybutylene terephthalates, polyethelene naphthalates, polyacrylonitriles, polymethyl pentenes, polyvinyl chlorides, polyethylenes, polypropylenes, polybutylenes and copolymers of any two or more thereof, the same materials in principle being useful for the base components of packages or containers other than bottles.

The complementary species of the barrier component may in turn be selected from the group consisting of polyvinyl alcohols, polyvinyl amines, polyvinyl imines, polyvinyl acetates, polyglycols, polyacrylic acids, polyalkylacrylic acids, polyacrylamides, polyalkyl acrylamides, polyvinyl pyrrolidones, polylactides, polyanhydrides, polyamides, celluloses, pectins, proteins, gums, hydroxymethyl celluloses, carboxylmethyl celluloses, hydroxyethyl starches, carboxymethyl starches, cellulose acetates, cellulose acetate butyrates, cellulose acetate proprionates and copolymers of any two or more thereof. Useful complementary species thus include natural polymers which may be of plant, animal or microbial origin, and such natural polymers when chemically modified. Useful species include polyvinyl alcohols and polyvinyl amines, particularly when interacted together to form polyvinyl alcohol/polyvinyl amine interpolymer complexes, and an especially useful interpolymer complex has been found to be a polyvinyl acetate interacted with a polymethylvinyl ether/maleic acid copolymer. Thus, the complementary species of the barrier component may be selected from polyvinyl alcohols and polymethyl vinyl ether/maleic acid copolymers. The complementary species of the barrier component may each have a molecular mass in the range 4 000-100 000 g/mol, the major proportion of the molecules thereof having molecular masses falling within this range, the molecular mass preferably being 28 000-76 000 g/mol. The mass ratio between the polymeric species of the mixture, for example when there are two species such as a polyvinyl alcohol and a polyvinyl amine, may be in the range 1000:1-1:1000 preferably 1000:5-5:1000 and more preferably 95:5-60:40.

The surface of the base component, where it is coated and lined by the barrier component, may be activated by having been subjected to a technique selected from the group consisting of oxyfluorination, flame treatment, plasma treatment corona discharge treatment and combinations of any two or more thereof.

Further according to the invention there is a provided a process for producing a packaging material which comprises a polymeric base component and a barrier component which coats and lines a surface of the base component, the barrier component inhibiting migration of gases, vapours and liquids through the base component, the process comprising the step of coating at least one surface of the base component with a barrier component in the form of a polymeric layer which comprises at least two complementary polymeric species which are polar and water soluble, and have different chemical compositions, the layer lining the base component and the coating step causing the complementary species to interact together physically by interpolymer complexation to form an interpenetrating physical network which provides the barrier component.

The process may include the step of shaping the base component into a package or container. The coating step may thus take place after the step of shaping the base component into a package or container. The coating step may take place on an inner surface of the package or container. Instead, or in addition, the coating step may take place on an outer surface of the container.

The coating step may comprise physically adhering the barrier component to the base component by electrostatic bonding. Instead or in addition, the coating step may comprise chemically adhering the barrier component to the base component by covalent bonding.

The process may include the step, after the coating of the base component with each barrier component, of providing a protective coating on the opposite side of each barrier component from the base component, remote from the base component. The process may include the step of selecting the material of the protective coating from the group consisting of thermosetting polymers, ultraviolet-curable polymers and thermoplastic polymers. More particularly, the process may include the step of selecting the material of the protective coating from materials of the group consisting of the polymeric material of the base component, polyurethanes, urethane acrylates, polyvinylidine chlorides, polyacrylates, polyepoxides, polydimethyl, siloxanes and copolymers of any two or more thereof. Thus, the barrier component will be sandwiched between the base component and the barrier component, for example as three face-to-face layers forming a laminate. In particular polyurethanes may be used as the protective coating; and applying the protective coating may be by spraying, dipping, flow-coating, powder-coating, extrusion-coating or vapour deposition.

The process may include the step of selecting the base component from materials of the group consisting of polyethylene terephthalates, polyethylene terephthalate glycols, polycarbonates, polystyrenes, polyamides, polybutylene terephthalates, polyethelene naphthalates, polyacrylonitriles, polymethyl pentenes, polyvinyl chlorides, polyethylenes, polypropylenes, polybutylenes and copolymers of any two or more thereof.

The process may include the step of selecting each of the complementary species of the barrier component from the group consisting of polyvinyl alcohols, polyvinyl amines, polyvinyl imines, polyvinyl acetates, polyglycols, polyacrylic acids, polyalkylacrylic acids, polyacrylamides, polyalkyl acrylamides, polyvinyl pyrrolidones, polylactides, polyanhydrides, polyamides, celluloses, pectins, proteins, gums, hydroxymethyl celluloses, carboxylmethyl celluloses, hydroxyethyl starches, carboxymethyl starches, cellulose acetates, cellulose acetate butyrates, cellulose acetate proprionates and copolymers of any two or more thereof. In particular, the process may include the step of selecting each of the complementary species of the barrier component from the group consisting of polyvinyl alcohols and polymethyl vinyl ether/maleic acid copolymers. The process may include the step of selecting each of the complementary species of the barrier component to have a molecular mass in the range 4 000-100 000 g/mol, the major proportion of the molecules thereof having molecular masses falling within this range, and the molecular mass range may be 28 000-76 000 g/mol.

The process may include the step, prior to the coating of the base component with the barrier component, of activating the surface of the base component. The step of activating the surface of the base component may include physically activating said surface, by subjecting it to an activation technique selected from roughening or abrading, ultraviolet radiation treatment, gamma radiation treatment, corona discharge treatment, flame treatment, plasma treatment and combinations of two or more thereof. Instead, of or in addition, the step of activating the surface of the base component may include chemically activating said surface, by subjecting it to an activation technique selected from etching, ozone treatment, fluorine treatment, chlorine treatment, oxidising treatment and combinations of two or more thereof. In particular, the activation step may be selected from the step of oxidising by means of a strong oxidising agent selected from potassium peroxidisulphate, azoisobutylnitrite, potassium permanganate, the step of fluorinating, the step of oxyfluorinating and combinations of any two or more said steps.

More specifically, the activation may be by exposing the base component surface to fluorine-containing gas mixture containing as little as 0.001% by volume fluorine, preferably >1% and more preferably >5%, the fluorine optionally being admixed with an inert diluent species such as nitrogen, or with a reactive species such as chlorine, sulphur dioxide or, in particular, oxygen, at a pressure of 0.01-500 kPa, preferably 10-300 kPa, more preferably 20-50 kPa, and at a temperature of 0-100° C. or more, conveniently at or above ambient, but below the softening point or melting point of the polymeric material of the base component. The temperature will usually be above ambient, because increases in temperature lead to increases in reaction rate. Preferably the activation results in the provision of a surface tension for the activated surface at 20° C. of at least 45 mN/m, more preferably at least 50 mN/m. For example, the activation may be an oxyfluorination of the type described in U.S. Pat. No. 5,900,321.

The coating of the base component surface with the barrier component may be by forming a mixture which is a solution of the complementary species of the barrier component in a solvent, coating the base component with the solution, and removing the solvent from the coating to dry the coating.

While the packages or containers of the present invention can be made by coating the base component with the barrier component and then forming the packages or containers thereafter, as packaging articles, it is expected that, usually, as indicated above the packaging articles will be formed from the polymer of the base component, after which the coating thereof with the barrier component will take place, optionally on an interior surface, on an exterior surface, or on both interior and exterior surfaces thereof. Coating may be restricted to the exterior surface when the barrier component is water-soluble, and when the package or container is intended to hold contents, such as aqueous contents, which can interact or react adversely with the material of the barrier component.

When, as indicated above, coating the base component surface with the barrier component is by forming a mixture in the form of a solution, for example an aqueous solution, of the complementary species of the barrier component mixture, the coating of the base component with the solution may be by spray-coating.

In tests carried out by the applicant, the present invention has demonstrated substantial utility in resisting unwanted migration through package or container walls of gases in particular. In this context, the invention will now be described in more detail, with reference to the following non-limiting illustrative Example.

EXAMPLE

Polyethylene terephthalate (PET) bottles with a volume of 500 ml, a wall thickness of 0.4-0.5 mm, a diameter of 60 mm and a height of 225 mm and polypropylene (PP) bottles with a volume of 500 ml, a wall thickness of 0.45-0.50 mm were used. The bottles were oxyfluorinated by placing them under air at atmospheric pressure in a sealed reactor at 25° C., evacuating the air from the reactor until an absolute pressure of 25 kPa was reached, and injecting a gas mixture comprising 20% F2 and 80% N2 by volume into the reactor until an absolute pressure of 30 kPa was reached. These reactor conditions were maintained for 20 seconds for the polyethylene terephthalate bottles and 20 seconds for the polypropylene bottles, after which the reactor was evacuated and flushed with air at atmospheric pressure prior to opening the reactor and removing the bottles.

The bottles were spray-coated on their exterior surfaces using a Nordson air-spray unit with the compositions respectively shown in Tables 1 and 2 set forth below. Horn air pressure was set at 30 psi, atomising air at 40 psi, trigger air at 60 psi and fluid pressure at 30 psi. Two coatings were applied, for the first coating the bottles were rotated on a rotating shaft at 300 rpm and sprayed for a period of 2 seconds. Rotating direction was then reversed and the bottles were sprayed for an additional 2 second period at 300 rpm.

Bottles were allowed to air-dry for 120 minutes and then dried for a further period of 2 hours at 55° C. in an oven.

The bottles were then dip-coated in an acrylic-urethane overcoat solution using the compositions shown in the Table 3 set forth below and dried in an oven at 55° C. for 2 hours. The bottles were removed and oxygen transmission rates were determined using a Mocon Oxtran oxygen permeability measurement unit.

TABLE 1

PET Bottles

| Composition | Quantity % | Coating Thickness μm | Average Oxygen Transmission Rate cc/Bottle/Day | No of Samples |
| --- | --- | --- | --- | --- |
| None - Control | — | — | 0.0520 | 2 |
| Water | 90 | 10-20 | 0.0028 | 3 |
| Polyvinyl alcohol[1] | 7 | | | |
| Methyl vinyl ether-maleic acid copolymer[2] | 3 | | | |

[1]Celvol 107: 98.5% hydrolyzed polyvinyl acetate; available from Celanese Chemicals, 1601 West LBJ Freeway, Dallas, Texas, USA.
[2]Gantrez S97: available from International Specialty Products, 1361 Alps Road, Wayne, New Jersey, USA

TABLE 2

PP Bottles

| Composition | Quantity % | Coating Thickness μm | Average Oxygen Transmission Rate cc/Bottle/Day | No of Samples |
| --- | --- | --- | --- | --- |
| None - Control | — | — | 0.3690 | 2 |
| Water | 90 | 10-20 | 0.0400 | 2 |
| Polyvinyl alcohol[1] | 7 | | | |
| Methyl vinyl ether-maleic acid copolymer[2] | 3 | | | |

3. Celvol 107: 98.5% hydrolyzed polyvinyl acetate; available from Celanese Chemicals, 1601 West LBJ Freeway, Dallas, Texas, USA.
4. Gantrez S97: available from International Specialty Products, 1361 Alps Road, Wayne, New Jersey, USA With regard to the compositions of Tables 1 and 2, the two polar polymer species polyvinyl alcohol and methyl vinyl ether/maleic acid copolymer were found to form an interpolymer complex comprising an interpenetrating physical network.

TABLE 3

| Ingredient | Quantity Ratios by weight |
| --- | --- |
| Urethane resin[1] | 1 |
| Elastic Addivite[2] | 0.1 |
| Thinner[3] | 0.5 |
| Hardener[4] | 0.5 |

[1]Permacron MS Vario Clearcoat 8000 available from: Spies Hecker GmbH, Fritz-Hecker-Strasse 47-107, Cologne, Germany
[2]Permasolid Elastic Additiv 9050 available from: Spies Hecker GmbH, Fritz-Hecker-Strasse 47-107, Cologne, Germany
[3]Permacron Reducer 3363 available from: Spies Hecker GmbH, Fritz-Hecker-Strasse 47-107, Cologne, Germany
[4]Permacron MS Hardener Plus 3040 medium available from: Spies Hecker GmbH, Fritz-Hecker-Strasse 47-107, Cologne, Germany

The invention claimed is:

1. A packaging material which comprises: a polymeric base component; and a barrier component which coats and lines a surface of the base component, the barrier component
   a): inhibiting migration of gases, vapours and liquids through the base component; and
   b): comprising a polymeric layer which coats and lines the surface of the base component,
   the polymeric layer comprising a polyvinyl alcohol and a methyl vinyl ether/maleic acid copolymer as different polymeric species which are polar and which are water soluble, and which are complementary in that they are bound together physically by interpolymer complexation to form an interpenetrating physical network which provides the barrier component.

2. A packaging material as claimed in claim 1, which is in the form of a package or container.

3. A packaging material as claimed in claim 2, in which the package or container is selected from the group consisting of capsules, blister packages, sachets, envelopes, jerry cans, bottles and jars.

4. A packing material as claimed in claim 2, which has an inner surface which is coated and lined by the barrier component.

5. A packaging material as claimed in claim 2, which has an outer surface which is coated and lined by the barrier component.

6. A packaging material as claimed in claim 1, in which the barrier component adheres to the base component physically by electrostatic bonding.

7. A packaging material as claimed in claim 1, in which the barrier component adheres to the base component chemically by covalent bonding.

8. A packaging material as claimed in claim 1, in which each barrier component has a surface remote from the base component and having a protective coating thereon, on the opposite side of the barrier component from the base component.

9. A packaging material as claimed in claim 8, in which the material of the protective coating is of a material selected from the group consisting of thermosetting polymers, ultraviolet-curable polymers and thermoplastic polymers.

10. A packaging material as claimed in claim 9, in which the material of the protective coating is selected from the group consisting of the polymeric material of the base component, polyurethanes, urethane acrylates, polyvinylidine chlorides, polyacrylates, polyepoxides, polydimethyl siloxanes and copolymers of any two or more thereof.

11. A packaging material as claimed in claim 1, which is in the form of a bottle for use in the bottling of carbonated drinks or beverages, there being a single barrier component which is located on the outer surface of the bottle, the base component comprising a polymeric plastics material selected from the group consisting of polyethylene terephthalates, polyethylene terephthalate glycols, polycarbonates, polystyrenes, polyamides, polybutylene terephthalates, polyethelene naphthalates, polyacrylonitriles, polymethyl pentenes, polyvinyl chlorides, polyethylenes, polypropylenes, polybutylenes and copolymers of any two or more thereof.

12. A packaging material as claimed in claim 1, in which the complementary species of the barrier component each have a molecular mass in the range 4 000-100 000 g/mol, the major proportion of the molecules thereof having molecular masses falling within this range.

13. A packaging material as claimed in claim 12, in which the molecular mass range is 28000-76 000 g/mol.

14. A packaging material as claimed in claim 1, in which the surface of the base component, where it is coated and lined by the barrier component, is activated by a technique selected from the group consisting of oxyfluorination, flame treatment, plasma treatment, and combinations of any two or more thereof.

15. A process for producing a packaging material which comprises a polymeric base component and a barrier component which coats and lines a surface of the base component, the barrier component inhibiting migration of gases, vapours and liquids through the base component, the process comprising the step of coating at least one surface of the base component with a barrier component in the form of a polymeric layer which comprises a polyvinyl alcohol and a methyl vinyl ether/maleic acid copolymer as complementary polymeric species which are polar and water soluble, and have different chemical compositions, the layer lining the base component and the coating step causing the complementary species to interact together physically by interpolymer complexation to form an interpenetrating physical network which provides the barrier component.

16. A process as claimed in claim 15, which includes the step of shaping the base component into a package or container.

17. A process as claimed in claim 16, in which the coating step takes place after the step of shaping the base component into a package or container.

18. A process as claimed in claim 16, in which the coating step takes place on an inner surface of the package or container.

19. A process as claimed in claim 16, in which the coating takes place on an outer surface of the container.

20. A process as claimed in claim 15, in which the coating step comprises physically adhering the barrier component to the base component by electrostatic bonding.

21. A process as claimed in claim 15, in which the coating step comprises chemically adhering the barrier component to the base component by covalent bonding.

22. A process as claimed in claim 15, which includes the step, after the coating of the base component with each barrier component, of providing a protective coating on the opposite side of each barrier component from the base component, remote from the base component.

23. A process as claimed in claim 15, which includes the step of selecting the material of the protective coating from the group consisting of thermosetting polymers, ultraviolet-curable polymers and thermoplastic polymers.

24. A process as claimed in claim 15, which includes the step of selecting the material of the protective coating from the group consisting of the polymeric material of the base component, polyurethanes, urethane acrylates, polyvinylidine chlorides, polyacrylates, polyepoxides, polydimethyl siloxanes and copolymers of any two or more thereof.

25. A process as claimed in claim 15, which includes the step of selecting the base component from materials of the group consisting of polyethylene terephthalates, polyethylene terephthalate glycols, polycarbonates, polystyrenes, polyamides, polybutylene terephthalates, polyethelene naphthalates, polyacrylonitriles, polymethyl pentenes, polyvinyl chlorides, polyethylenes, polypropylenes, polybutylenes and copolymers of any two or more thereof.

26. A process as claimed in claim 15, which includes the step of selecting each of the complementary species of the barrier component to have a molecular mass in the range 4 000-100 000 g/mol, the major proportion of the molecules thereof having molecular masses falling within this range.

27. A process as claimed in claim 26, in which the molecular mass range is 28 000-76 000 g/mol.

28. A process as claimed in claim 15, which includes the step, prior to the coating of the base component with the barrier component, of activating the surface of the base component.

29. A process as claimed in claim 28, in which the step of activating the surface of the base component includes physically activating said surface, by subjecting it to an activation technique selected from roughening or abrading, ultraviolet radiation treatment, gamma radiation treatment, flame treatment, plasma treatment and combinations of two or more thereof.

30. A process as claimed in claim 28, in which the step of activating the surface of the base component includes chemically activating said surface, by subjecting it to an activation technique selected from etching, ozone treatment, fluorine treatment, chlorine treatment, oxidising treatment and combinations of any two or more thereof.

31. A process as claimed in claim 30, in which the activation step is selected from the step of oxidising by means of a strong oxidising agent selected from potassium peroxidisulphate, azoisobutylnitrite, potassium permanganate, the step of fluorinating, the step of oxyfluorinating and combinations of any two or more said steps.

32. A process as claimed in claim 15, in which the coating of the base component surface with the barrier component is by forming a mixture which is a solution of the complementary species of the barrier component in a solvent, coating the base component with the solution, and removing the solvent from the coating to dry the coating.

\* \* \* \* \*